Nov. 25, 1969     H. SCHOMMER     3,480,308

UNIVERSAL JOINT

Filed Oct. 11, 1967

Inventor:
Heinrich Schommer
by Michael S. Striker

United States Patent Office 3,480,308
Patented Nov. 25, 1969

3,480,308
UNIVERSAL JOINT
Heinrich Schommer, 3 Schulstrasse,
6603 Sulzbach-Saar, Germany
Filed Oct. 11, 1967, Ser. No. 674,515
Claims priority, application Germany, Oct. 14, 1966,
P 40,578
Int. Cl. F16c *11/06;* F16b *7/00;* B25g *3/38*
U.S. Cl. 287—87                    10 Claims

ABSTRACT OF THE DISCLOSURE

A universal joint which provides an articulate connection between idler rollers or the like. The shafts of the rollers carry spherical heads which are received in a hollow socket composed of two sections having faces which abut against each other in a plane including the axes of the shafts. The faces of the sections are provided with recesses which together form two elongated slots for the shafts. The fastener means for connecting the sections to each other comprises a bolt which is normal to the plane wherein the faces of the sections abut against each other and extends between the spherical heads. The shafts can be removed from the socket as soon as the two sections are separated from each other.

Background of the invention

The present invention relates to universal joints in general, and more particularly to improvements in ball joint type connections. Such joints can be utilized between suspended idler rollers for belt conveyors or the like.

A joint of the type in question which is known in the art comprises two shafts which support the idler rollers and whose end portions carry spherical heads received in a hollow socket composed of two sections which abut against each other in a plane making right angles with the common plane of the axes of the roller shafts. The sections have flanges which are coupled to each other by means of a U-shaped ring. It was found that the just described joint exhibits certain drawbacks, particularly as regards the manner of assembling and dismantling its parts. When it becomes necessary to replace one of the shafts, the U-shaped ring which holds together the flanges of the socket sections must be pried open by means of a special tool and is often destroyed so that the joint must be furnished with spare rings. When the defective shaft is removed and replaced by a fresh shaft, the U-shaped ring must be redeformed to provide a satisfactory connection between the flanges. Moreover, the shafts of the idler rollers extend through slots which are provided in the two sections of the socket and, therefore, the head of a damaged shaft must be separated from the shaft because it cannot pass through the slot in the respective section. If the heads are fastened to the shafts by split rings or like readily separable connections, the detachment of heads is relatively simple; however, it is often necessary to provide permanent connections between the shafts and the respective heads so that the replacement of a shaft invariably requires heating to destroy a welded or soldered connection. Such heating can affect the bearings for the idler rollers because the lubricant is likely to become overheated and to escape from the bearing.

Summary of the invention

It is an object of the present invention to provide a novel and improved universal joint which can be readily assembled or taken apart without heating and without destruction of permanent connections between certain component parts.

Another object of the invention is to provide a joint which can be assembled or taken apart by resorting to readily available tools.

A further object of the invention is to provide a universal joint which can be taken apart even if the spherical heads are welded, soldered, glued or otherwise permanently connected with the respective shafts.

An additional object of the invention is to provide an improved socket for use in a joint of the above outlined character.

A concomitant object of the invention is to provide a novel connection between the sections of the improved socket.

Briefly outlined, the invention is embodied in a universal joint which is particularly suited to connect suspended idler rollers for conveyor belts or the like and which can be used with advantage between mutually inclined shafts of idler rollers. The joint comprises two shafts having axes located in a common plane and normally making an obtuse angle with each other (for example, an angle of about 140 degrees), spherical heads provided on the adjoining end portions of the shafts, a hollow socket accommodating the heads and comprising two preferably mirror symmetrical sections having abutting faces located in the common plane of the aforementioned axes, pairs of recesses provided in the faces of sections in such a way that each recess of one section forms with one recess of the other section an elongated slot which receives with clearance one of the shafts for angular movement with reference to the other shaft, and fastener means preferably including a bolt extending between the heads and through holes provided in the sections at right angles to the common plane of the axes of the roller shafts to provide a readily separable connection between the sections.

The novel features which are considered as characteristic of the invention are set forth in particular in the appended claims. The improved universal joint itself, however, both as to its construction and the mode of assembling the same, together with additional features and advantages thereof, will be best understood upon perusal of the following detailed description of a specific embodiment with reference to the accompanying drawing.

Description of the preferred embodiment

Figure 1:
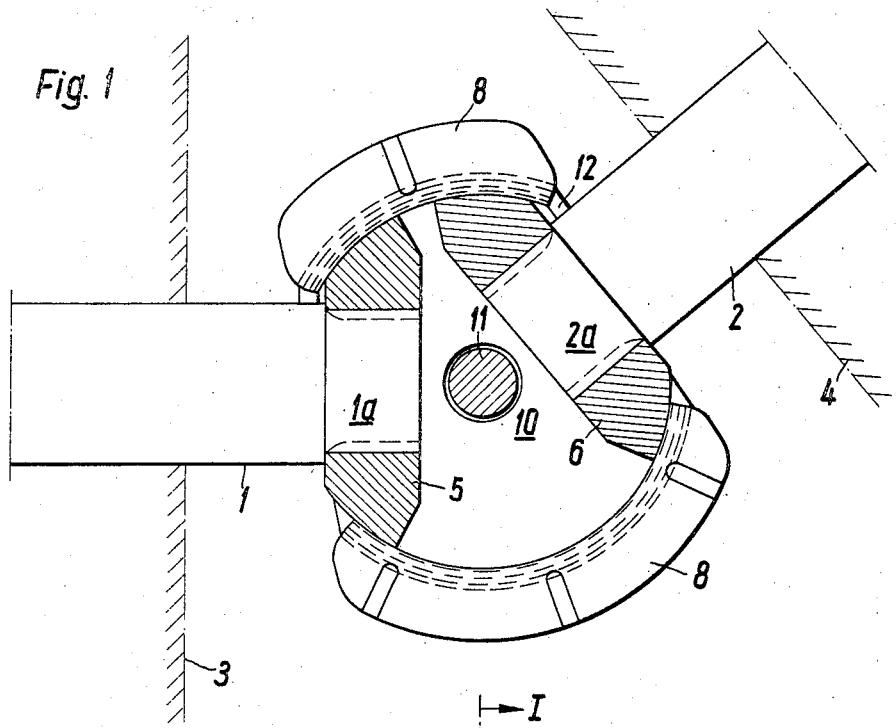
FIG. 1 is an axial sectional view of a universal joint which embodies the present invention, the section being taken in the direction of arrows from the line I—I of FIG. 2.
Figure 2:
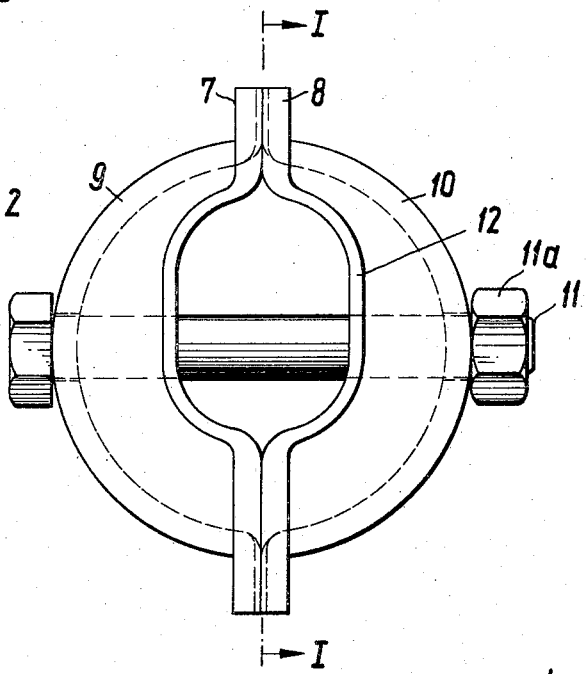
FIG. 2 is a side elevational view of the universal joint as seen from the left-hand side of FIG. 1 but with the shafts for the idler rollers omitted.

The drawing illustrates a universal joint which can be used to connect two suspended idler rollers 3, 4 for a conveyor belt or the like. The joint comprises two shafts 1 and 2 whose axes are located in a common plane and which normally make with each other an obtuse angle, for example, an angle of about 140 degrees. Each of the shafts 1, 2 carries one of the rollers 3, 4 and such rollers can be guided by a track or the like, not shown. The end portions 1a, 2a of the shafts 1, 2 are adjacent to each other and are provided with external threads meshing with internal threads provided in two spherical heads 5, 6 whose spherical external surfaces are guided along internal surfaces provided in a hollow two-piece socket composed of two sections 9, 10 which are mirror symmetrical with reference to the common plane of the axes of shafts 1 and 2. The sections 9, 10 have outwardly extending flanges 7, 8 whose faces abut against each other in the aforementioned common plane and are provided with pairs of recesses together forming two slots 12 of substantially rectangular outline. The slots 12 are elongated in the aforementioned common plane and serve to accommodate with clearance portions of shafts 1 and 2 so that these shafts can change their mutual inclination when the peripheral surfaces of the heads 5, 6 travel along the internal surface of the socket. The slots 12 determine the extent to which the shafts 1 and 2 can pivot with reference to each other and their ends are preferably rounded as shown in FIG. 2.

The fastener means for releasably connecting the sections 9, 10 of the socket to each other comprises an elongated bolt 11 which is normal to the plane of the axes of shafts 1, 2 and extends through registering holes or bores provided in the sections 9, 10. The median portion of the bolt 11 extends between and serves as a stop for the spherical heads 5, 6. A nut 11a which meshes with the bolt 11 can be removed when necessary to permit rapid and convenient dismantling of the joint.

It is clear that the improved joint is susceptible of many modifications without departing from the spirit of the present invention. For example, the nut 11a can be replaced by a cotter pin or the like and the end portions 1a, 2a of the shafts 1, 2 can be secured to the spherical heads 5, 6 by soldering, welding or by a suitable adhesive. Furthermore, the length and the mutual inclination of slots 12 can be changed, depending on the desired extent of angular displacement of shafts 1 and 2 with reference to each other.

The advantages of the just described universal joint over the aforementioned prior art universal joint will be readily understood. The bolt 11 can be readily removed without resorting to special tools so that the sections 9, 10 can be moved apart. The heads 5, 6 need not be removed from the shafts 1, 2 when the operator wishes to replace one of these shafts because the shafts are automatically exposed and can be withdrawn from the slots 12 as soon as the sections 9, 10 are moved apart. This is due to the fact that the slots 12 are formed by recesses which are provided in the exposed faces of the flanges 7, 8 and because the plane in which the faces of the flanges 7, 8 abut against each other is the common plane of the axes of shafts 1 and 2. Thus, the heads 5, 6 can remain connected to the shafts 1, 2 during insertion or withdrawal from the socket, and this holds true regardless of whether the heads are detachably or permanently connected with the respective shafts.

Without further analysis, the foregoing will so fully reveal the gist of the present invention that others can, by applying current knowledge, readily adapt it for various applications without omitting features which fairly constitute essential characteristics of the generic and specific aspects of the above described contribution to the art and, therefore, such adaptations should and are intended to be comprehended within the meaning and range of equivalence of the claims.

What is claimed as new and desired to be protected by Letters Patent is set forth in the appended claims.

I claim:
1. A universal joint, particularly for connecting suspended idler rollers for conveyor belts, comprising a pair of idler roller shafts extending at an angle to each other and having adjacent end portions and axes located in a common plane; spherical heads provided on the end portions of said shafts; a socket for said heads including two sections having abutting faces located in said common plane, said sections further having pairs of recesses provided in the respective faces thereof and together forming a pair of slots each of which is elongated in and along said plane so as to be longer in said plane than in a direction transverse thereto and which receives with clearance one of said shafts; and fastener means securing said sections to each other.

2. A universal joint as defined in claim 1, wherein said fastener means comprises an elongated bolt extending through holes provided in said sections at right angles to said common plane.

3. A universal joint as defined in claim 2, wherein said bolt is located between said heads.

4. A universal joint as defined in claim 1, wherein said slots are of substantially rectangular outline.

5. A universal joint as defined in claim 1, wherein said sections are mirror symmetrical with reference to said common plane.

6. A universal joint as defined in claim 1, wherein said axes normally make an obtuse angle with each other.

7. A universal joint as defined in claim 1, wherein said heads are provided with internal threads meshing with external threads on the end portions of the respective shafts.

8. A universal joint as defined in claim 1, wherein said sections have abutting flanges and said faces are provided on said flanges.

9. A universal joint as defined in claim 1, wherein said heads have convex external surfaces and said socket has complementary concave internal surfaces for said external surfaces.

10. A universal joint as defined in claim 1, wherein said fastener means is readily separable from at least one of said sections.

References Cited

UNITED STATES PATENTS

| | | | |
|---|---|---|---|
| 1,633,153 | 6/1927 | Wray. | |
| 3,070,219 | 12/1962 | Donadio | 198—192 |
| 3,338,381 | 8/1967 | Imse | 308—20 XR |

FOREIGN PATENTS

| | | |
|---|---|---|
| 1,211,990 | 3/1966 | Germany |

DAVID J. WILLIAMOWSKY, Primary Examiner

A. V. KUNDRAT, Assistant Examiner

U.S. Cl. X.R.
198—192; 308—20